Aug. 14, 1956     C. E. FOWLER, JR     2,758,882

APPARATUS FOR ELEVATING GRANULAR MATERIAL

Filed July 18, 1950

INVENTOR
Carl E. Fowler, Jr.
BY
William Klabunde
ATTORNEY

United States Patent Office 2,758,882
Patented Aug. 14, 1956

2,758,882

APPARATUS FOR ELEVATING GRANULAR MATERIAL

Carl E. Fowler, Jr., Hattiesburg, Miss., assignor to Houdry Process Corporation, Wilmington, Del., a corporation of Delaware Application July 18, 1950, Serial No. 174,443

7 Claims. (Cl. 302—53)

This invention relates to apparatus for elevating granular material by means of a gaseous medium, and is particularly directed to gas lift systems adapted for use in the chemical processing and petroleum refining industries wherein granular contact material, such as catalyst, is continuously circulated through one or more treating zones, the contact material flowing downwardly through the zones and then being elevated for reuse by means of a gas lift.

A typical system to which the present invention may be applied is illustrated and described in an article entitled "Houdriflow: New Design in Catalytic Cracking," appearing at page 78 of the January 13, 1949 issue of the "Oil and Gas Journal." The article discloses, briefly, a catalytic cracking system for the refining of hydrocarbons comprising superimposed reactor and regenerator vessels connected to form a downflow path through which catalyst in the form of beads or pellets is passed by gravity flow. The catalyst is supplied to the downflow path from an upper lift hopper disposed at an elevation substantially above the uppermost vessel, and is withdrawn from the lowermost vessel and passed downwardly into a lower lift hopper. In the connecting conduits of the downflow path the catalyst gravitates as a compact moving column, and within the vessel or vessels which form contact zones for engagement of the catalyst with gaseous reactants, the catalyst gravitates in the form of a compact non-turbulent moving bed.

The lower lift hopper provides an introduction chamber, or engaging zone, wherein the catalyst may be engaged by the gaseous lift medium and introduced therewith into the lower end of a lift pipe, which extends from a low point within the introduction chamber upwardly to a point within the upper lift hopper. Engagement between the catalyst and the lift gas within the lower lift hopper may be effected in various ways, as may also introduction of the lift gas into the zone of catalyst engagement. Since the means for introducing lift gas into the lower lift hopper or introduction chamber, and for effecting the necessary engagement thereof with the solid contact material, form no part of the present invention, a detailed description thereof will not be given. For a proper understanding of the present invention, it is not considered essential to indicate more than the fact that the engagement of the contact material with the lift gas has been effected in the lower lift hopper or introduction chamber in such a way as to cause a continuous flow of the contact material, by entrainment in the gas stream, upwardly through the lift pipe. The average discharge velocity of the particles of contact material is normally of such magnitude as to require a considerable disengaging height in which to separate the solids from the gas. Since the necessary disengaging height dictates the size and height requirements of the upper lift hopper, and since the latter is usually of considerable size and is supported at a considerable distance above the ground, a reduction in the disengaging height requirement will contribute materially to savings in the costs of labor and material for fabricating and supporting the vessel.

Referring, in general, to gas lifts for elevating granular material into an upper sealed hopper or chamber, it is usually an essential requirement that impingement of the granular material against the top wall of the disengagement chamber be avoided. Excessive impingement has an adverse affect upon both the equipment and the granular material, causing rapid erosion of the former and attrition of the latter. In cases where the fines resulting from the continual attrition of the granular material constitute a waste product which must be removed from the system, and be replaced with fresh granular material, the results of operating the lift system with insufficient disengaging height may be costly. In addition to damage to the catalyst, there is of course the damage to the apparatus caused by erosion.

In is a principal object of the present invention therefore to provide means for elevating such granular material through a lift pipe, and consequently disengaging the material from the gaseous lift medium whereby the advantages of both low disengaging height and low attrition rates may be realized.

When granular material is elevated through a lift pipe of uniform flow area, and with substantially no change in temperature, the particle velocity normally increases throughout the length of the lift pipe, attaining its maximum value at the instant of discharge from the lift pipe. In accordance with the present invention, means are provided to effect periodic reductions in the particle velocity of the solids as they travel upwardly through the lift pipe, so that upon their discharge from the upper end of the lift pipe a relatively short disengaging height will be required to separate all but the smallest particles or fines from the gas stream. Such velocity reduction is effected in accordance with the invention by withdrawing portions of the lift gas from the lift pipe at spaced points distributed along its length. If the velocity reduction is to be effected immediately prior to discharge from the lift path, the gas may be withdrawn near the upper end of the lift pipe. On the other hand, if it is desired to maintain a substantially constant superficial velocity throughout the lift, the gas withdrawal points may be distributed along the entire lift path, and there may be withdrawn at each point or level an amount of gas sufficient to provide a constant average velocity between successive points of gas withdrawal. For the purpose of gas withdrawal, the walls of the lift pipe are provided with a series of openings of a size sufficient to permit the withdrawal of the desired amount of lift gas, but insufficient to permit the passage therethrough of the granular contact material, with the exception, of course, of the fines which are usually produced by attrition of the particles during circulation. While in its broader aspects, the invention is concerned primarily with means for effecting the removal of lift gas from the lift pipe in order to reduce particle velocities, the invention may also include means for collecting removed lift gas and entrained fines at the points of gas withdrawal, for separating the solids from the gas, and for disposing of the separated materials. For a fuller understanding of the invention, reference may be had to the accompanying drawing forming a part of this application in which:

Fig. 1 diagrammatically illustrates a hydrocarbon conversion system including a gas lift to which the method and apparatus of the present invention may be applied.

Figures 1, 2, 3:
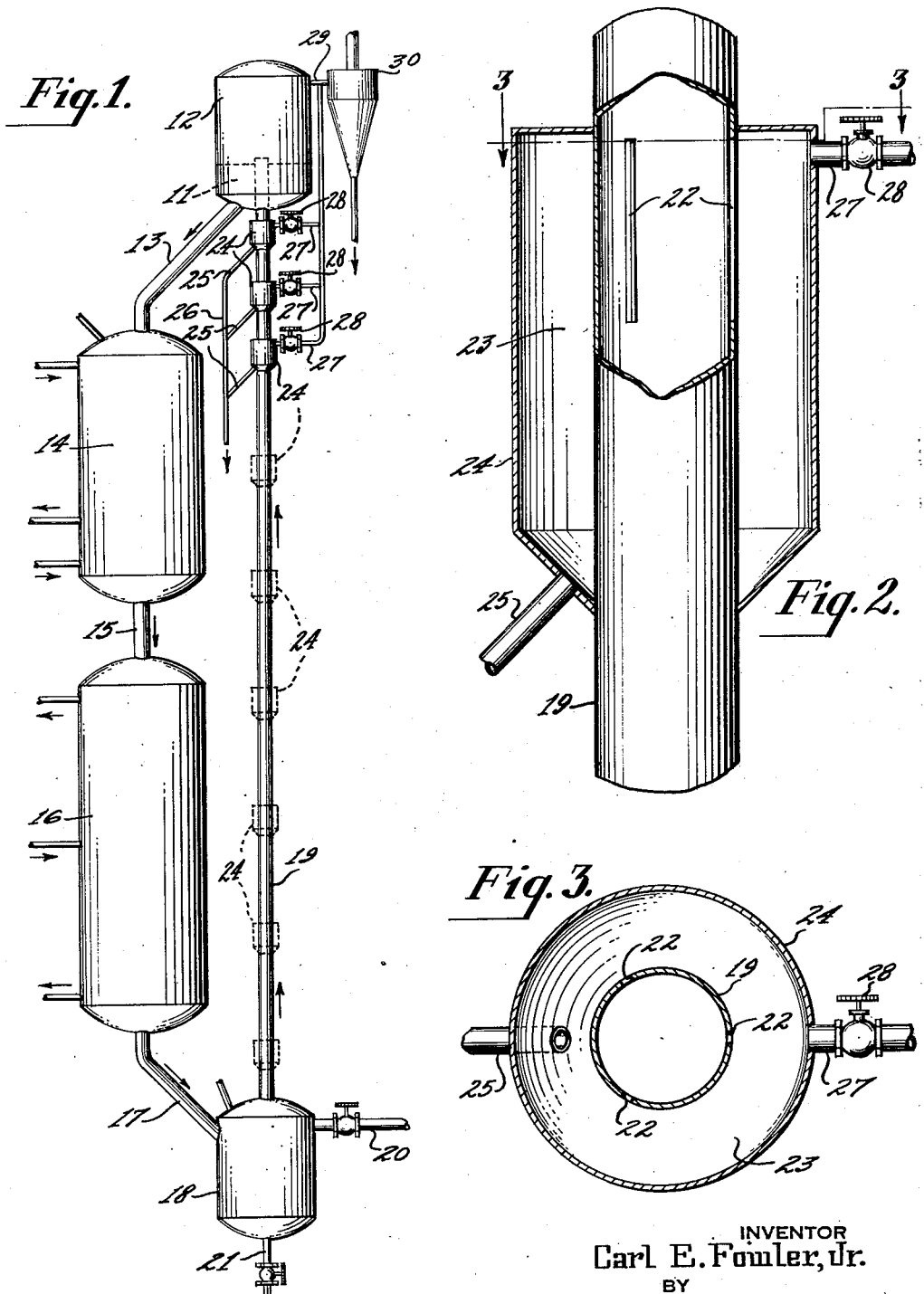
Fig. 2 is an enlarged fragmentary elevation view of the upper portion of the lift pipe, diagrammatically showing an arrangement of gas withdrawal ports and collecting chambers associated therewith.
Fig. 3 is a cross-section view taken along the line 3—3 of Fig. 2.

Since the invention is directed solely to the operation of the gas lift, and specifically to apparatus for controlling the solids velocity within the lift pipe, and since an adequate description of the conversion system as a whole is given in the aforementioned article appearing in the "Oil and Gas Journal," it is not believed necessary to more than briefly describe the system illustrated in Fig. 1.

Fig. 1 shows a typical hydrocarbon conversion system in which contact material, maintained as a compact moving bed 11 in the lower region of an upper lift hopper 12, which also comprises the disengaging zone hereinafter described, is continuously withdrawn as a compact moving column through a seal leg 13 and passed into the upper end of a reaction vessel 14, wherein, in known manner, the contact material gravitates as a compact moving bed while being contacted with gaseous reactants introduced into the vessel from a source, not shown, to carry out the desired conversion. The gaseous products of reaction are separated from the contact material in the lower portion of the vessel 14, the gaseous products being withdrawn from the vessel and passed to subsequent treating equipment, not shown, and the contact material bearing a carbonaceous deposit thereon being withdrawn as a compact moving column through seal leg 15 and passed into the upper end of a regenerator or kiln 16, wherein the contaminated contact material is contacted with a combustion supporting gas to burn off the carbonaceous deposit. The contact material gravitates as a compact moving bed through the regenerator 16, the material being withdrawn from the lower end thereof in the form of a compact moving column and passed through a seal leg 17 into a lower lift hopper or introduction chamber 18. The gaseous products of combustion formed in the regenerating zone are separated from the contact material in known manner and discharged from the kiln. If desired, a portion thereof may be employed as the gaseous lift medium for elevating the contact material from the lower lift hopper to the upper lift hopper.

An elongated lift pipe 19 extends between the lower and upper lift hoppers, the lower end thereof terminating at a low point within the introduction chamber 18, and the upper end thereof extending a substantial distance within the upper lift hopper 12.

Lift gas may be introduced into the lower lift hopper through inlet line 20, disposed in the upper portion of the lift hopper, and through inlet line 21 disposed at the lower end thereof. Various procedures are available for introducing the contact material into the lift pipe, and for controlling the rate of flow therethrough. Such procedures may, for example, involve specific ways of introducing the lift gas into the introduction zone and of effecting engagement with the solids, and methods for dividing the total lift gas into separately introduced streams for the separate purposes of providing the major lifting force and providing flow rate control. The present invention does not concern the means for effecting such gas introduction, but relates to means for controlling the solids stream after it enters the lift pipe.

The upper end of the lift pipe is provided, at spaced levels below and adjacent to the upper lift hopper 12, with circumferential rows of equi-spaced longitudinally extending slots 22, arranged as diagrammatically illustrated in Figs. 2 and 3. In one embodiment, the slots, which form gas withdrawal passages, are provided at three separate levels, as shown in Fig. 1. Referring to Figs. 2 and 3, three slots of uniform width are provided in each circumferential row. If desired, the slots of each row may be of a different length, so that the cross-section flow area for withdrawn gas is different at each level. For example, in a lift pipe of several hundred feet in length the circumferential rows may start 20 feet from the top of the lift pipe and be spaced 20 feet apart. The slots may be about 1/16 of an inch in width. The slots of the upper row may be about 23 inches in length, the slots of the middle row may be about 16 inches in length, and the slots in the lowermost row may be about 13 inches in length. It is to be understood, of course, that the number, shape and spacing of the slots as above-described represent merely a typical application of the invention, and are not to be construed as limiting the invention. The slots may, if desired, be provided at points along the entire length of the lift pipe, as illustrated diagrammatically by the broken lines.

Gas manifolds or collecting chambers 23 are formed about each slotted area of the lift pipe by concentric housing members 24, closed at each end and attached to the outer wall of the lift pipe. The housing members 24 are funnel-shaped at their lower ends and are provided thereat with drain conduits 25, so that solid particles carried through the slots with the outgoing gas may collect and be drained from the chambers 23. Drain conduits 25 are connected to a common conduit 26, shown in Fig. 1, which may convey the collected solid particles to a storage hopper, not shown.

The withdrawn gas, which may contain a small percentage of fines, is discharged from the collecting chamber 23 through outlet conduit 27, provided with a valve 28, and is passed into a riser 28 common to all the gas outlet lines 27. Riser 28 conveys the withdrawn gas and entrained fines into the gas outlet line 29 leading out of the upper end of the lift hopper 12. The combined streams of lift gas are then passed to a conventional gas-solids separator 30, the separated gas and solids being disposed of in known manner. It is contemplated that the rate of gas withdrawal from the lift pipe 19 may be controlled either by the cross-section flow area of the slots 22, or by control of the gas discharge rate through the valve-controlled outlet lines 27.

The operation of the apparatus of the invention, as applied to a typical lift system in which velocity reduction is desired only near the upper end of the lift pipe, may be exemplified by the following three examples showing lift performance, without and with gas withdrawal, from a lift pipe 210 feet long and having an inside diameter of 19 inches. Gas withdrawal slots, when provided, are arranged in three circumferential rows spaced 20, 40 and 60 feet, respectively, from the upper end of the lift pipe, with three equi-spaced slots 1/16 inch wide in each row. The slots in the top row are 23 inches in length, those in the middle row are 16 inches in length, and the slots in the bottom row are 13 inches in length. For normal operation, gas withdrawal through the slots at each level is at the rate of 1000 pounds per hour.

*Examples*

| | Lift pressure drop, p. s. i. | Catalyst rate, tons/hr. | Gas rate, lbs./hr. | Catalyst exit velocity, ft./sec. | |
|---|---|---|---|---|---|
| | | | | Unslotted | Slotted |
| I | 6.0 | 257 | 14,900 | 30 | 17 |
| II | 8.0 | 195 | 13,100 | 20 | 5 |
| III | 8.0 | 428 | 16,500 | 40 | 25 |

The foregoing examples clearly illustrate the pronounced effect that intermediate gas withdrawal from the lift pipe may have upon the solids flow rate. It may be seen from the data of these examples that gas withdrawal in the neighborhood of about 15–25 percent of the inlet gas rate may reduce the exit velocity, as compared to the exit velocity without gas withdrawal, by an amount in the range of about 35–75%. It also appears from the data that the velocity reduction through gas withdrawal is greatest for low solids flow rates.

It is to be understood that gas withdrawal from the lift pipe may be made at levels therein other than those illustrated in the drawing, and that the invention is not limited to withdrawal through openings of the configuration shown. The openings may be of any shape effective to withdraw gas in the quantity desired without concurrent withdrawal of substantial quantities of the solid contact material. If desired, for example, the slots may extend circumferentially around the pipe instead of longitudinally thereof. Or, the pipe openings my be of a size sufficient to pass all the particles, but be provided with screens to hold back all but the fines.

A lift system constructed and operated in accordance with the invention as disclosed herein is of considerable advantage in processing systems where it is commercially desirable to keep the size of the equipment and the supporting structure to a minimum, and where it is desirable to effect disengagement of solids from a stream of lift gas transporting the same in a minimum of vertical distance above the upper end of the lift pipe. It is also of particular advantage whenever it is desired to maintain a substantially uniform superficial velocity through the lift.

For a lift system in which it is desired to maintain a velocity not exceeding a predetermined maximum value by withdrawal of gas at intervals along the entire lift pipe, the following example will serve to illustrate the application of the invention. Gas is withdrawn from the lift pipe at 50 foot intervals in such amounts as to permit the catalyst to approach, but not exceed, a velocity of 12 feet per second:

*Example IV*

Lift pipe:
    Diameter (interval) _____ 12 in.
    Height _____ 200 ft.
Catalyst properties:
    Type _____ Beads.
    Particle diameter _____ 0.12 in.
    Particle density _____ 80 lbs./cu. ft.
    Bulk density _____ 52 lbs./cu. ft.
Rates:
    Catalyst _____ 430 tons/hr.
    Air (inlet) at 100° F_____ 13,420 lbs./hr.

| Level in lift | Gas withdrawn, lbs./hr. | Catalyst velocity, ft./sec. |
|---|---|---|
| Bottom | | 10.5 |
| 50 ft | 2,340 | 9.7 |
| 100 ft | 2,300 | 9.3 |
| 150 ft | 2,660 | 8.1 |
| Top | | 12.0 |

What is claimed is:

1. In apparatus for elevating granular material by means of a gaseous lift medium, the combination of: an elongated lift pipe adapted to provide a continuous confined path for upward flow of said granular material; a disengaging chamber surrounding and extending upwardly above the upper end of said lift pipe, adapted to disengage said granular material from the lift gas by complete gravitational deceleration of the granular material and free fall thereof to a collecting region within said chamber spaced from the stream of solids discharging from said lift pipe; means for separately withdrawing separated lift gas and granular material from said disengaging chamber; means comprising a plurality of openings in the side of said lift pipe below said disengaging chamber adapted to effect controlled withdrawal of lift gas from said lift pipe, said openings being of such limited dimensions as to restrict the withdrawal therethrough of large-size particles of said granular material while permitting the passage of small-size attrited particles accompanying the withdrawn lift gas, and at least one secondary disengaging chamber supported by said lift pipe and being in open communication with said lift pipe through at least one of said plurality of openings, whereby the larger-size particles of that portion of the granular material which has passed through said opening are disengaged from the withdrawn portion of said gaseous medium.

2. Apparatus as defined in claim 1, including controlled means for discharging said withdrawn gas separately from said secondary disengaging chamber, and means for separately discharging disengaged granular material therefrom.

3. Apparatus as defined in claim 1, including means for adjustably controlling the flow of said gaseous material through said openings in the side of said lift pipe.

4. Apparatus as in claim 1 in which said openings are disposed at a plurality of spaced levels along said lift pipe below said disengaging zone.

5. Apparatus as in claim 1 in which said openings are in the form of elongated slots.

6. Apparatus as in claim 5 in which said elongated slots are disposed at a plurality of levels below said disengaging zone and are of progressively increasing length from level to level in the direction of flow.

7. Apparatus as in claim 1 in which said openings are in the form of elongated slots extending longitudinally with respect to said lift pipe.

References Cited in the file of this patent

UNITED STATES PATENTS

| | | |
|---|---|---|
| 494,274 | Kelley | Mar. 28, 1893 |
| 584,021 | Tilghman, Jr. | June 8, 1897 |
| 1,032,115 | Cook | July 9, 1912 |
| 1,498,630 | Jensen | June 24, 1924 |
| 1,597,438 | Ennis | Aug. 24, 1926 |
| 1,912,910 | Neuman et al. | June 6, 1933 |
| 2,463,623 | Huff | Mar. 8, 1949 |
| 2,487,370 | Putney | Nov. 8, 1949 |
| 2,509,983 | Morrow | May 30, 1950 |
| 2,693,395 | Berg | Nov. 2, 1954 |
| 2,694,605 | Berg | Nov. 16, 1954 |